(12) United States Patent
O'Coin

(10) Patent No.: US 10,329,035 B2
(45) Date of Patent: Jun. 25, 2019

(54) FECAL COLLECTION BAG RETENTION DEVICE FOR USE IN ZERO GRAVITY

(71) Applicant: HAMILTON SUNDSTRAND CORPORATION, Charlotte, NC (US)

(72) Inventor: James R. O'Coin, Somers, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/723,518

(22) Filed: Oct. 3, 2017

(65) Prior Publication Data

US 2019/0100337 A1 Apr. 4, 2019

(51) Int. Cl.
| | | |
|---|---|---|
| B64G 1/60 | (2006.01) | |
| B65F 1/14 | (2006.01) | |
| B65F 1/00 | (2006.01) | |
| A47K 11/02 | (2006.01) | |

(52) U.S. Cl.
CPC .............. *B64G 1/60* (2013.01); *B65F 1/0006* (2013.01); *B65F 1/1405* (2013.01); *A47K 11/02* (2013.01); *B65F 2210/12* (2013.01)

(58) Field of Classification Search
CPC .... B30B 1/04; B64G 1/52; B64G 1/60; A47K 11/02
USPC ......... 100/220; 141/73, 80; 4/316, 464, 475, 4/479, 484; 53/526, 527, 567
See application file for complete search history.

(56) References Cited

U.S. PATENT DOCUMENTS

| | | | | |
|---|---|---|---|---|
| 4,564,469 A | * | 1/1986 | Cochet | G21F 9/36 100/181 |
| 4,760,784 A | * | 8/1988 | Whiteside | B30B 9/30 100/219 |
| 5,005,457 A | | 4/1991 | Thornton, Jr. et al. | |
| 5,388,391 A | * | 2/1995 | Parker | B30B 9/3017 53/157 |
| 5,704,404 A | * | 1/1998 | Balding, Jr. | B30B 9/3028 100/220 |
| 6,000,323 A | * | 12/1999 | Schlegel | B30B 1/003 100/211 |
| 6,626,321 B2 | * | 9/2003 | Jaeger | B65F 1/04 220/23.87 |
| 8,567,157 B2 | * | 10/2013 | Dunn | B65F 1/0006 53/370 |
| 8,887,941 B2 | * | 11/2014 | Heintzman | B65D 25/14 220/495.06 |
| 8,923,470 B2 | | 12/2014 | Convert et al. | |
| 2012/0292324 A1 | * | 11/2012 | Szafranski | B65F 1/068 220/495.06 |
| 2016/0324377 A1 | | 11/2016 | Morris | |

* cited by examiner

*Primary Examiner* — David P Angwin
*Assistant Examiner* — Nicholas A Ros
(74) *Attorney, Agent, or Firm* — Carlson, Gaskey & Olds, P.C.

(57) ABSTRACT

A fecal canister for use in a space application has a canister body extending from an inlet end toward a remote end. Hooks are aligned along an inner surface of the canister from the inlet end towards the remote end. In embodiments, a compaction lid, or a storage bag catch on the hooks to maintain a compacted position.

19 Claims, 4 Drawing Sheets

FECAL COLLECTION BAG RETENTION DEVICE FOR USE IN ZERO GRAVITY

STATEMENT REGARDING FEDERALLY SPONSORED RESEARCH OR DEVELOPMENT

This invention was made with government support under Contract No. NNH16C087C, awarded by NASA. The Government has certain rights in this invention.

BACKGROUND

This application relates to a fecal collection device for use in zero gravity, wherein compacted bags are retained at a compacted position.

As can be appreciated, space vehicles operate in zero or near zero gravity. The interior of such vehicles is limited and space is at a premium. For manned space vehicles, human waste must be accommodated.

Thus, it is known to provide compacting devices for fecal material. Generally, toilets for use is space environments are known which move fecal material into storage bags. The storage bags are then stored in a collection unit. A compactor compacts the bags to better utilize available space.

The compactors are provided with air holes that must remain unblocked. There is sometimes a challenge in zero or near zero environments that the bags may expand back and may even block the air holes.

SUMMARY

A fecal canister for use in a space application has a canister body extending from an inlet end toward a remote end. Hooks are aligned along an inner surface of the canister from the inlet end towards the remote end. In embodiments, a compaction lid, or a storage bag catch on the hooks to maintain a compacted position.

These and other features may be best understood from the following drawings and specification.

DETAILED DESCRIPTION

Figure 1:
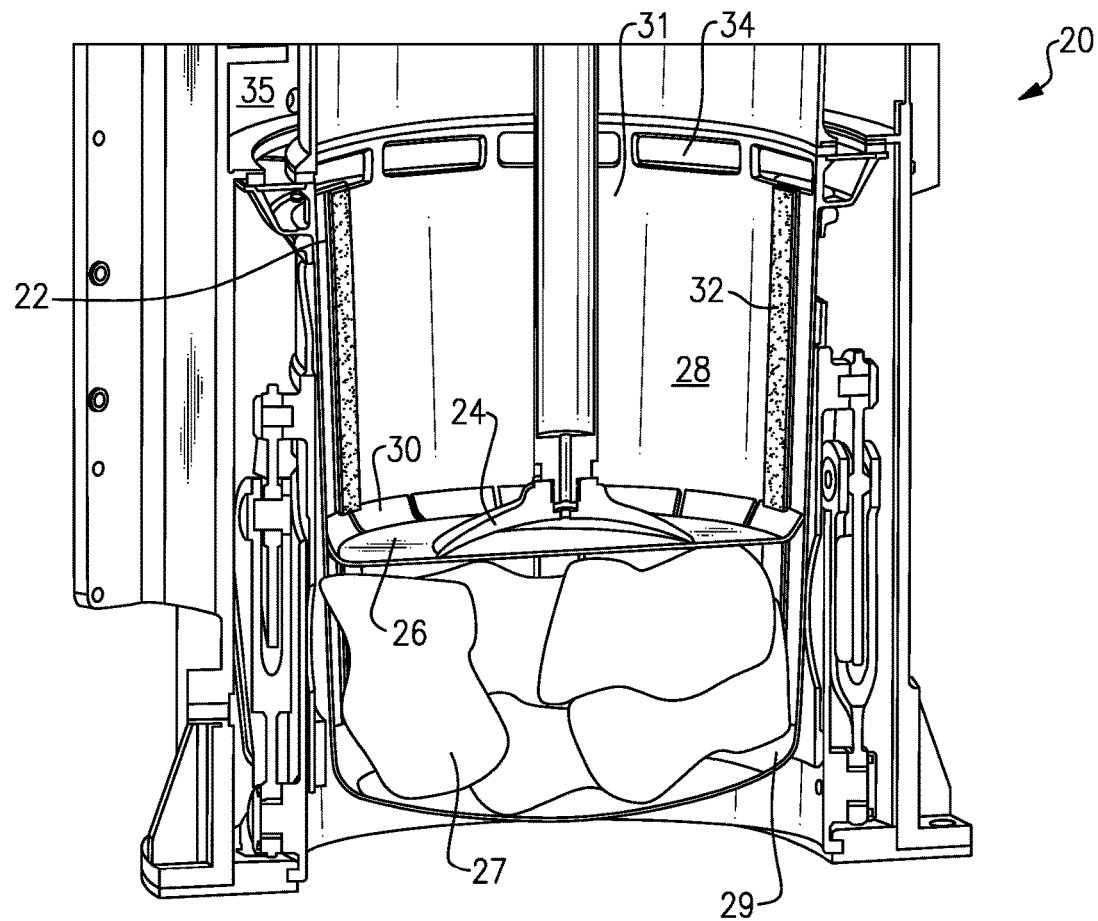
FIG. 1 shows a fecal canister and related system.

FIG. 1 shows a system 20 including a fecal canister 22. A compactor 24 is shown compacting a compaction lid 26 downwardly to compress a plurality of fecal collection bags 27. As the compactor 24 moves downwardly, the compaction lid 26 also moves downwardly.

The interior 28 of the canister 22 is angled such that at end 29, remote from entry end 31, there is a smaller cross-sectional area than at the interior at an entry end 31.

A plurality of straps 32, formed of the hook side of a hook and loop fastener material, extend between the entry end 31 and towards closed or remote end 29. While illustrated as extending the entire distance, the material need only extend over a portion of the distance.

The compaction lid 26 is shown to have a plurality of tabs 30 at an outer periphery. As the cross-sectional area of the interior 28 becomes smaller, with movement from end 31 towards end 29, the tabs 30 bend as shown in this figure and toward the entry end 31.

While the compactor 24 is being utilized to compact the bags 27, the tabs 30 will move past the hooks. However, once the compaction has stopped the hooks will retain the tabs 30 and, thus, the compaction lids 26, such that the bags 27 do not expand back toward the end 31.

As shown, air holes 34 allow airflow into an outer chamber 35. In this manner, the holes 34 are not blocked by expanding collection bags 27. The airflow provides several functions. It assists separation of the feces from the astronaut. Once separated, the airflow keeps the feces at the bottom of the collection bag away from the user. Once the collection bag is closed, the airflow carries the collection bag into the canister. This is why it is desirable that the airflow holes remain open and not covered by the collection bag.

Figure 2:
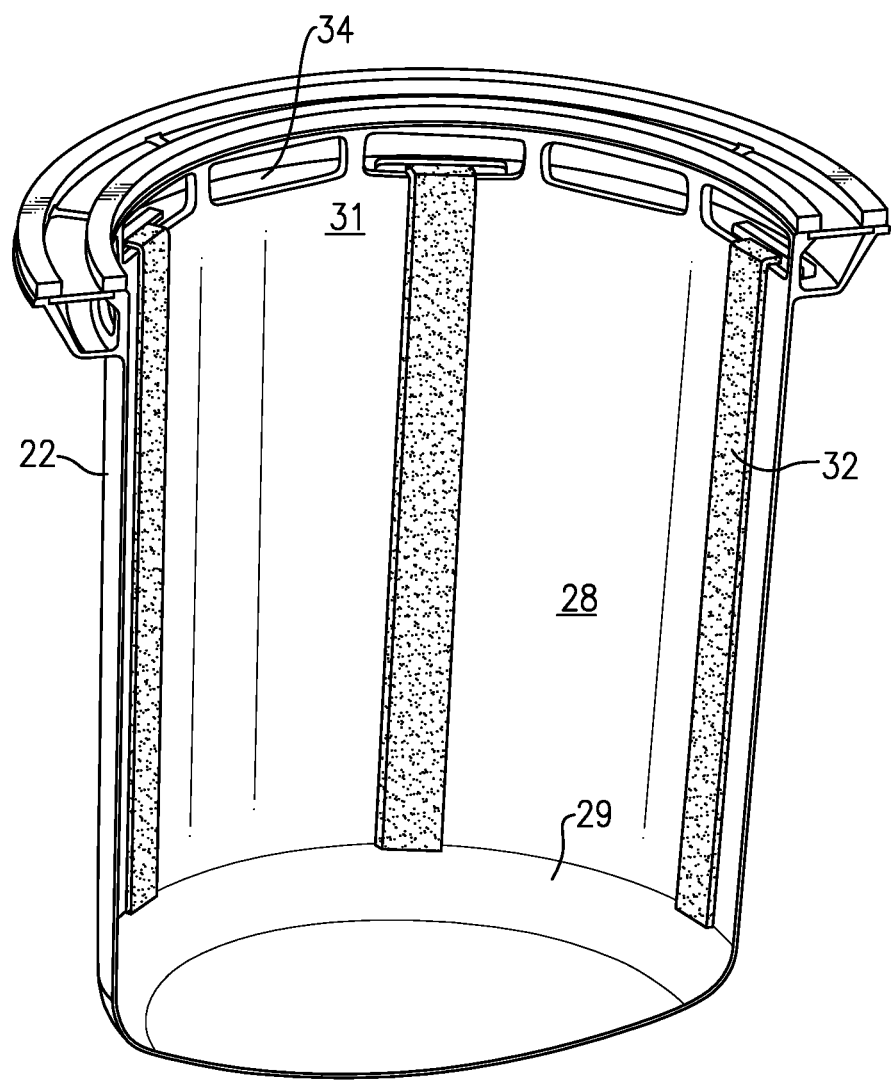
FIG. 2 is an internal view of the fecal canister.

FIG. 2 shows the interior 28 of the canister 22 and the strips 32 extending between ends 31 and 29.

Figure 3B:
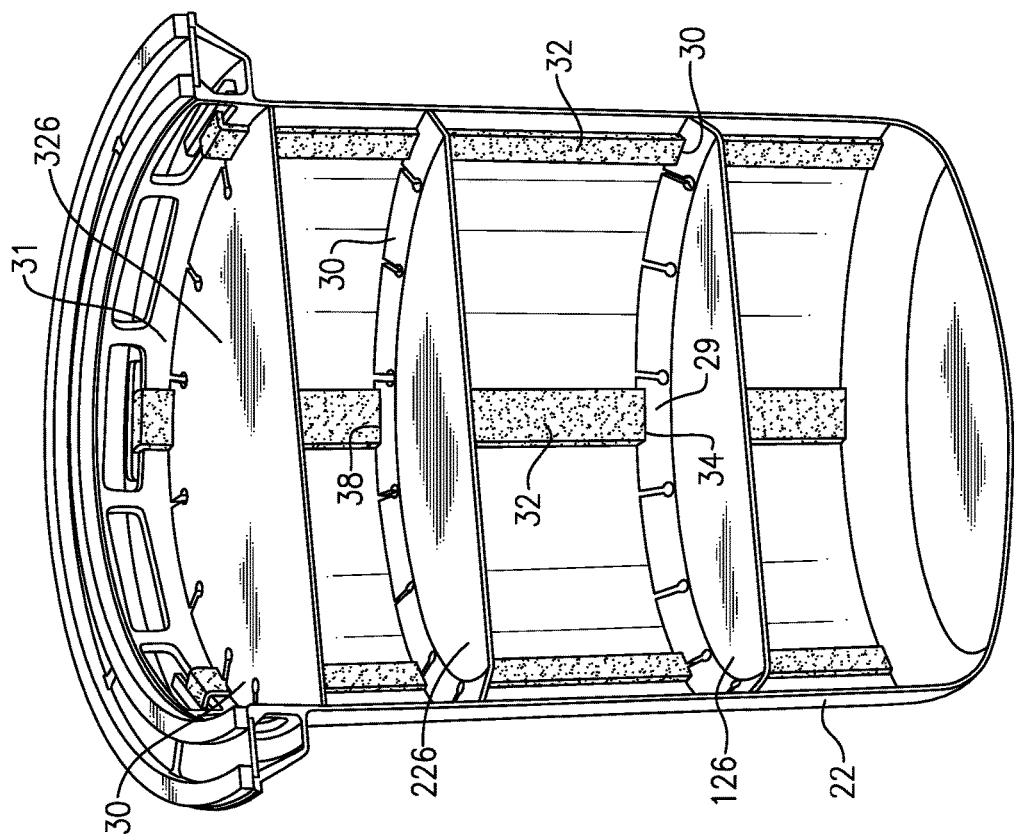
FIG. 3B is similar to FIG. 3A, but the storage bags have been removed.
Figure 3A:
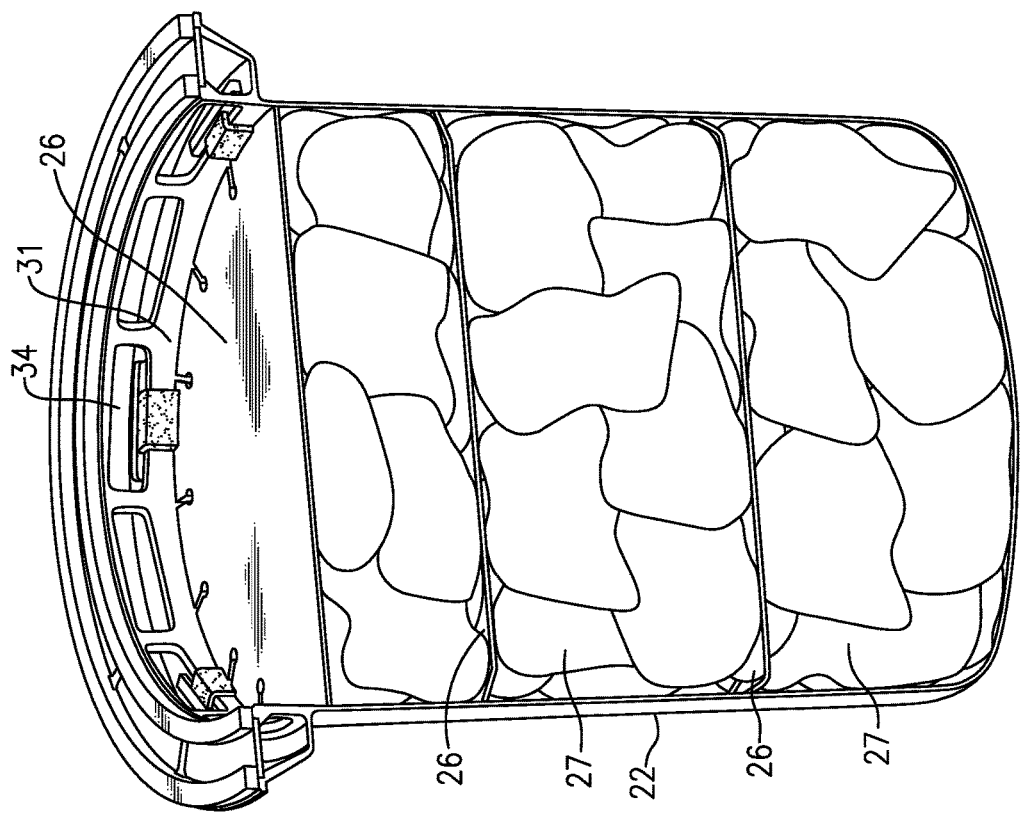
FIG. 3A shows a first storage scenario.

FIG. 3A shows a first scenario wherein a plurality of compaction lids 26 have now been utilized to repeatedly compact storage bags 27 over time. As shown, a third compaction lid 26 is adjacent end 31. This illustrates a condition when the canister 22 is generally full.

FIG. 3B shows the scenario of FIG. 3A, but with the bags 27 removed. As can be appreciated, the tabs 30 associated with the innermost compaction lid 126 have bent back to a greater extent than the tabs 30 on an intermediate compaction lid 226. The compaction lid 326 adjacent the end 31 has its tabs 30 barely bent.

Thus, the hooks on the strips 32 will capture the tabs 30 on the innermost lid 126. As shown at 34, the hooks will have a good area on the tabs 30 to grab. Tabs 30 on lid 226 are less bent. Still, as shown at 38, there will be sufficient "bite" to hold the tabs 30 on the intermediate compactor lid 226. The strips 32 should be positioned such that the hooks are generally facing the remote end.

Further, in embodiments, even the tabs 30 on the outermost lid 326 should be held adequately to resist expansion.

Figure 4:
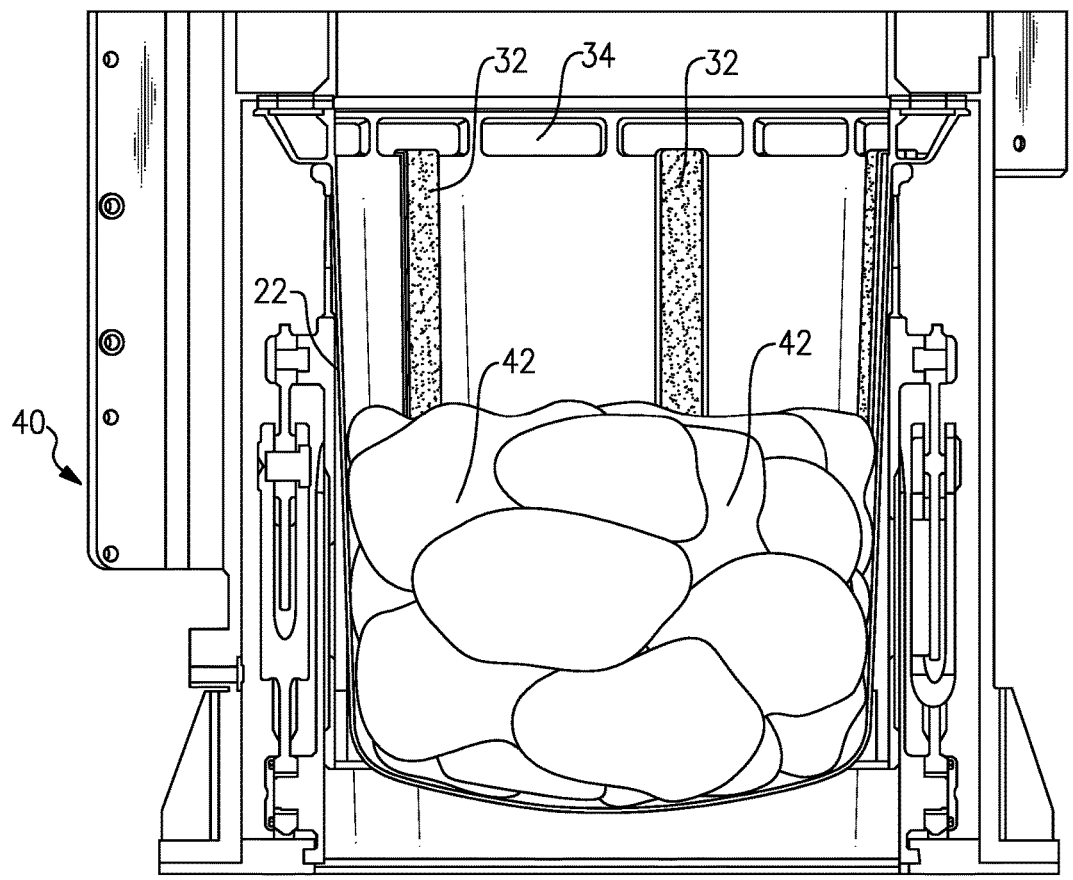
FIG. 4 shows a second embodiment.

FIG. 4 shows an alternative embodiment 40. Here, the canister 22 is again provided with the strips 32 and the air holes 34. However, the bags 42 utilized in this embodiment, will be what are captured by the hooks on the strip 32.

Bags 42 may be formed of a material that includes a non-woven material, such as a polyester. The bags 42 may have other material to provide loops to catch on the hooks.

The bag can be formed with a polytetrafluoroethylene (PTFE) coated interior to provide better storage. The non-woven outer side of the bag will snag on the hooks of the strips 32.

One hook and loop type material that may be utilized is available under the trademark Velcro® owned by Velcro Industries. However, other materials having an adequate hooking capability may also be utilized.

In one embodiment, both the lid structure of FIGS. 3A and 3B can be used in combination with the bag structure of FIG. 4.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A fecal canister for use in a space application comprising:

a canister body extending from an inlet end toward a remote end;

hooks aligned along an inner surface of said canister from said inlet end towards said remote end;

wherein said hooks are provided on strips of a material having the hook side of a hook and loop type fastening arrangement; and wherein compaction lids are provided to be driven by a compactor to compact entrapped collection bags of fecal material.

2. The fecal canister as set forth in claim 1, wherein there are a plurality of said strips.

3. The fecal canister as set forth in claim 1, wherein there are air passage holes formed adjacent said inlet end.

4. The fecal canister as set forth in claim 1, wherein said compaction lids have tabs at an outer periphery which bend when forced between the inlet end and the remote end, and said tabs are captured by said hooks to prevent expansion.

5. The fecal canister as set forth in claim 1, wherein an inner cross-sectional area of said canister decreases from said inlet end moving toward said remote end.

6. The fecal canister as set forth in claim 5, wherein said compaction lids have tabs at an outer periphery which bend when forced into the decreasing cross-sectional area between the inlet end and the remote end, and said tabs are captured by said hooks to prevent expansion.

7. A fecal canister for use in a space application comprising:

a canister body extending from an inlet end toward a remote end;

hooks aligned along an inner surface of said canister from said inlet end towards said remote end;

collection bags utilized with said canister provided with an outer periphery having loops structure that will be captured by said hooks; and wherein compaction lids are provided to be driven by a compactor to compact entrapped collection bags of fecal material.

8. The fecal canister as set forth in claim 7, wherein said hooks are provided on strips of a material having the hook side of a hook and loop type fastening arrangement.

9. The fecal canister as set forth in claim 7, wherein said compaction lids have tabs at an outer periphery which bend when forced into the decreasing cross-sectional area between the inlet end and the remote end, and said tabs are captured by said hooks to prevent expansion.

10. The fecal canister as set forth in claim 7, wherein said bags are provided with a non-woven outer material to provide said loops.

11. The fecal canister as set forth in claim 10, wherein an inner surface of said bags is provided with a PTFE material and said non-woven material at an outer periphery.

12. A fecal canister arrangement for use in space applications comprising:

a canister body having an inlet end and a remote end and air passages adjacent said inlet end;

an interior of said canister decreasing in cross-section from said inlet end and moving toward said remote end;

a plurality of strips of the hook side of the hook and loop fastener material extending along the interior of said canister from said inlet end and toward said remote end; and a compaction lid and fecal collection bag, and at least one of said compaction lid and collection bags having structure to be hooked by said hooks on said strips of material to retain said at least one of said compaction lids and said collection bags after said collection bags have been compacted in volume.

13. The fecal canister arrangement as set forth in claim 12, wherein compaction lids are provided to be driven by a compactor to compact entrapped collection bags of fecal material.

14. The fecal canister arrangement as set forth in claim 13, wherein said compaction lids have tabs at an outer periphery which bend when forced into the decreasing cross-sectional area between the inlet end and the remote end, and said tabs are captured by said hooks to prevent expansion.

15. The fecal canister arrangement as set forth in claim 14, wherein collection bags utilized with said canister are provided with an outer periphery having loops structure that will be captured by said hooks.

16. The fecal canister arrangement as set forth in claim 12, wherein collection bags utilized with said canister are provided with an outer periphery having loops structure that will be captured by said hooks.

17. The fecal canister arrangement as set forth in claim 16, wherein said bags are provided with a non-woven outer material to provide said loops.

18. The fecal canister arrangement as set forth in claim 17, wherein an inner surface of said bags is provided with a PTFE material and said non-woven material at an outer periphery.

19. A fecal canister for use in a space application comprising:

a canister body extending from an inlet end toward a remote end;

hooks aligned along an inner surface of said canister from said inlet end towards said remote end;

wherein collection bags utilized with said canister are provided with an outer periphery having loops structure that will be captured by said hooks;

wherein compaction lids are provided to be driven by a compactor to compact entrapped collection bags of fecal material; and wherein said compaction lids have tabs at an outer periphery which bend when forced between the inlet end and the remote end, and said tabs are captured by said hooks to prevent expansion.

* * * * *